United States Patent
Takada et al.

(10) Patent No.: US 9,175,401 B2
(45) Date of Patent: Nov. 3, 2015

(54) PROCESS FOR PRODUCING SLIDING MEMBER AND SLIDING MEMBER

(75) Inventors: Ryotaro Takada, Tochigi (JP); Yoshitaka Tsujii, Tochigi (JP); Mayumi Saruyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 246 days.

(21) Appl. No.: 13/812,816

(22) PCT Filed: Jul. 26, 2011

(86) PCT No.: PCT/JP2011/066913
§ 371 (c)(1),
(2), (4) Date: Jan. 28, 2013

(87) PCT Pub. No.: WO2012/032869
PCT Pub. Date: Mar. 15, 2012

(65) Prior Publication Data
US 2013/0157072 A1   Jun. 20, 2013

(30) Foreign Application Priority Data

Sep. 9, 2010  (JP) ................................ 2010-202085
Sep. 9, 2010  (JP) ................................ 2010-202088

(51) Int. Cl.
*B32B 15/04*     (2006.01)
*C23C 20/04*    (2006.01)
(Continued)

(52) U.S. Cl.
CPC ............... *C23C 20/04* (2013.01); *B32B 15/013* (2013.01); *B32B 15/018* (2013.01); *B32B 15/04* (2013.01);
(Continued)

(58) Field of Classification Search
CPC .... B32B 15/017; B32B 15/018; B32B 15/04; B32B 15/08; B32B 15/088; B32B 15/092; B32B 15/20; B32B 15/013; C23C 20/00; C23C 20/02; C23C 20/04; C23C 24/00; C23C 24/08; C23C 24/085; C23C 24/087; C23C 24/082; C23C 30/00; C23C 30/005; C23C 28/00; Y10T 428/12069; Y10T 428/12389; Y10T 428/1275; Y10T 428/12569; Y10T 428/12896; Y10T 428/12076; Y10T 428/12083; Y10T 428/12097; Y10T 428/12104; Y10T 428/12111
USPC ......... 428/554, 557, 600, 652, 548, 626, 673, 428/336, 458, 418, 416
See application file for complete search history.

(56) References Cited

U.S. PATENT DOCUMENTS 6,455,475 B1 * 9/2002 Ogure .......................... 508/103
2009/0136747 A1   5/2009 Kikuchi

FOREIGN PATENT DOCUMENTS

JP    62-060969 A    3/1987
JP    2002-212761 A  7/2002
(Continued)

OTHER PUBLICATIONS

Office Action, Japanese Patent Application No. 2012-532905 dated Feb. 25, 2014.
(Continued)

*Primary Examiner* — Michael E La Villa
(74) *Attorney, Agent, or Firm* — Rankin, Hill & Clark LLP

(57) ABSTRACT

There are provided a sliding member that is enhanced in adhesiveness between the surface of a base member formed of aluminum or aluminum alloy and silver coating with a simple construction, and a method of manufacturing the sliding member. In a piston 1 having a sliding face 22 which slides in a cylinder bore 3, a silver coating layer 21 constituting the sliding face 22 is provided on the outer peripheral surface 11 of a main body 10 formed of aluminum alloy, and the silver coating layer 21 is formed by coating slurry having silver particles 23 dispersed in terpineol on the outer peripheral surface 11 of the main body 10 and heating the coated slurry and the main body 10 to remove terpineol in the slurry and fuse the silver particles 23 with one another.

16 Claims, 11 Drawing Sheets

(51) Int. Cl.
  *C23C 24/00* (2006.01)
  *C23C 28/00* (2006.01)
  *C23C 24/08* (2006.01)
  *B32B 15/01* (2006.01)
  *F16J 1/01* (2006.01)

(52) U.S. Cl.
  CPC ............... *C23C 24/00* (2013.01); *C23C 24/08* (2013.01); *C23C 28/00* (2013.01); *F16J 1/01* (2013.01); *Y10T 428/12069* (2015.01); *Y10T 428/1275* (2015.01); *Y10T 428/12076* (2015.01); *Y10T 428/12083* (2015.01); *Y10T 428/12097* (2015.01); *Y10T 428/12104* (2015.01); *Y10T 428/12111* (2015.01); *Y10T 428/12389* (2015.01); *Y10T 428/12569* (2015.01); *Y10T 428/12896* (2015.01)

(56) References Cited

FOREIGN PATENT DOCUMENTS

| | | |
|---|---|---|
| JP | 2005-305395 A | 11/2005 |
| JP | 2006-066838 A | 3/2006 |
| JP | 2007-203125 A | 8/2007 |
| JP | 2007-239866 A | 9/2007 |
| JP | 2008-082532 A | 4/2008 |
| WO | WO 2006/126614 A1 | 11/2006 |

OTHER PUBLICATIONS

Office Action, Japanese Patent Application No. 2012-532905 dated Dec. 3, 2013.
Chinese Office Action with English Translation dated Dec. 12, 2014, 37 pages.

\* cited by examiner (A)

(B)

PROCESS FOR PRODUCING SLIDING MEMBER AND SLIDING MEMBER

CROSS-REFERENCE TO RELATED APPLICATION

This application is a National Stage entry of International Application No. PCT/JP2011/066913 filed Jul. 26, 2011, which claims priority to Japanese Patent Application Nos. 2010-202085 and 2010-202088 filed Sep. 9, 2010, the disclosure of the prior applications are hereby incorporated in their entirety by reference.

TECHNICAL FIELD

The present invention relates to a sliding member manufacturing method of forming a sliding surface by applying silver coating onto the surface of a base member, and a sliding member, and particularly to a technique of improving the adhesiveness between the base member and the silver coating.

BACKGROUND ART

Emission reduction of carbon dioxide ($CO_2$ gas) as heat-trapping gas has recently become a worldwide theme, and emission reduction of carbon dioxide has been also strongly required to vehicles as discharging sources of carbon dioxide. Therefore, reduction of the friction between a sliding member and a slid member as a sliding partner material in a vehicle has been attempted. For example, it has been found that enhancement of fuel consumption, prevention of baking and prevention of occurrence of strange noise can be performed by subjecting the sliding surface of a piston (sliding member) of an internal combustion engine to a surface treatment.

As this type of surface treatment method has been proposed a method of infiltrating an aluminum (containing aluminum alloy) base member in chemical conversion coating liquid containing etching liquid and water-soluble metal salt to conduct a surface roughening treatment on the surface of the aluminum base member with the etching liquid, and substantially at the same time, forming metal coating on the surface of the aluminum base member with the metal constituting the water-soluble metal salt (see Patent Document 1, for example).

PRIOR ART

Patent Document

Patent Document 1: JP-A-2005-305395

SUMMARY OF THE INVENTION

Problem to be Solved by the Invention

However, in the above-described prior art, the adhesion between the aluminum base member and the metal coating is weak. Accordingly, there is a problem that exfoliation of the metal coating occurs due to insufficient adhesiveness between the aluminum base member and the metal coating when the aluminum base member to which the metal coating is applied is actually used under a harsh environment like a piston of an internal combustion engine or the like.

An electroplating method of infiltrating an aluminum base member in plating liquid of potassium silver cyanide and supplying current with the aluminum base member being used as a cathode to form silver coating on the surface of the base member has been executed as the method of subjecting the surface of the aluminum base member to silver coating. However, when coating is formed by using electroplating, a dedicated power supply device is generally required, and the facilities are on a large scale. In addition, much cost is required to an effluent treatment because cyan salt is used. Furthermore, when chemical conversion coating is formed on an aluminum base member, much impurities are contained, so that the purity of the coating is lowered and the thermal conductivity of the coating is lowered, resulting in a problem that the coating has a low sliding characteristic.

Therefore, the present invention has been implemented in view of the forgoing circumstances, and has an object to provide a sliding member in which adhesiveness between the surface of a base member formed of aluminum or aluminum alloy and silver coating can be enhanced with a simple construction, and a method of manufacturing the sliding member. Furthermore, the present invention has an object to form silver coating optimum to sliding and having high purity with a simple method, secure high adhesiveness and exclude use of harmful materials from a manufacturing process.

Means of Solving the Problem

In order to attain the above object, according to the present invention, a sliding member manufacturing method of forming silver film on the surface of a base member formed of aluminum or aluminum alloy to form a sliding face is characterized by comprising: coating suspended solution having silver particles dispersed in polar solvent on the surface of the base member; and heating the coated suspended solution and the base member to remove the solvent in the suspended solution and fuse the silver particles with one another to form the sliding face.

According to this construction, the silver particles coated on the surface of the base member are fused with one another to enable formation of the silver coating, the adhesiveness between the silver coating and the base member can be enhanced because the silver coating and the base member are joined to each other by intermolecular force, and the sliding member subjected to the silver coating having excellent mechanical strength can be simply formed. Furthermore, the affinity between solvent and water is enhanced by making the solvent have polarity. Therefore, when the suspended solution using this solvent is coated on the surface of the base member, it has high affinity to water molecules adsorbed to the surface of the base member, so that uniform coating can be formed particularly under even an humidity-uncontrollable working environment.

Furthermore, according to the present invention, in the above construction, the average particle diameter of the silver particles is set in the range from 30 nm to 80 nm. The joint force between the silver coating and the base member is closely associated with the average particle diameter of the silver particles, and thus the joint force trends to increase as the average particle diameter of the silver particles increases. Therefore, as the average particle diameter of the silver particles decreases, the joint force decreases and exfoliation of the silver coating is liable to occur. On the other hand, as the average particle diameter of the silver particles increases, the gap between the silver particles increases, and voids existing in the silver coating when the silver particles are thermally fused with one another increase. Therefore, the rate of the volume of silver metal existing in the silver coating per unit volume (this rate is referred to as silver purity in this specification) decreases, and the thermal conductivity of the silver coating decreases. In this construction, by setting the average particle diameter of the silver particles in the range from 30 nm to 80 nm, the joint force between the base member and the silver coating can be enhanced, the silver purity in the silver coating can be kept to a predetermined reference value or more, and the sliding member which is brought with both the adhesiveness and thermal conductivity of the silver coating can be formed.

Still furthermore, according to the present invention, in the above construction, at least a part of oxide film on the surface is removed before the coating is performed. According to this construction, a neogenetic face of aluminum or aluminum alloy is formed on the surface of the base member, so that the adhesiveness between the neogenetic face and the silver coating can be enhanced.

Still furthermore, according to the present invention, in the above construction, uneven portions are formed on at least a part of the surface before the coating is performed. According to this construction, the surface area of the base member can be increased by forming the uneven portions, and the adhesiveness between the base member and the silver coating can be further enhanced.

According to the present invention, a sliding member manufacturing method of forming silver film on the surface of a base member formed of aluminum or aluminum alloy to form a sliding face is characterized by comprising: forming a resin layer containing silver particles on the surface of the base member; coating suspended solution having silver particles dispersed in polar solvent on the resin layer; and heating the coated suspended solution, the resin layer and the base member to fuse the silver particles in the resin layer with the silver particles in the suspended solution and fuse the silver particles in the suspended solution with one another to form the sliding face.

According to this construction, the silver coating formed through fusion of the silver particles is joined to the base member through the resin layer, so that the adhesion stress between the base member and the silver coating can be enhanced, and the sliding member coated with the silver coating having excellent mechanical strength can be simply formed. Furthermore, the silver coating is formed by fusing the silver particles in the suspended solution with the silver particles in the resin layer, so that the joint force between the silver coating and the resin layer can be enhanced.

Furthermore, according to the present invention, in the above construction, the average particle diameter of the silver particles dispersed in the polar solvent is set in the range from 1 nm to 80 nm. As the average particle diameter of the silver particles increases, the gap between the silver particles also increases, so that voids existing in the silver coating when the silver particles are thermally fused with one another increases. Therefore, the rate of the volume of the silver metal existing in the silver coating per unit volume (silver purity) decreases, and the thermal conductivity of the silver coating decreases. In this construction, the average particle diameter of the silver particles is set within the range from 1 nm to 80 nm, whereby the silver purity in the silver coating can be kept to a predetermined reference value or more even when the average particle diameter is set to the maximum average particle diameter of 80 nm, whereby the sliding member having high thermal conductivity can be formed.

Furthermore, according to the present invention, in the above construction, the average particle diameter of the silver particles contained in the resin layer is set in the range from 4 µm to 30 µm. When the average particle diameter of the silver particles in the resin layer is smaller than 4 µm, the contact area between the silver particles and the silver coating is small, and thus the joint force between the resin layer and the silver coating decreases. On the other hand, when the average particle diameter of the silver particles in the resin layer is larger than 30 µm, the silver particles are hardly dispersed in the resin layer. Therefore, in this construction, the average particle diameter of the silver particles in the resin layers is set in the range from 4 µm to 30 µm, whereby the joint force between the silver particles in the resin layer and the silver coating can be enhanced.

Furthermore, according to the present invention, in the above construction, the resin layer is formed by using any one of imide-based resin, epoxy-based resin and nylon-based resin. Still furthermore, according to the present invention, in the above construction, at least a part of oxide film on the surface is removed before the resin layer is formed. According to this construction, the neogenetic face of aluminum or aluminum alloy is formed on the surface of the base member, so that the adhesiveness between the neogenetic face and the resin layer is enhanced.

Still furthermore, according to the present invention, in the above construction, uneven portions are formed on at least a part of the surface before the resin layer is formed. According to this construction, by forming the uneven portions, the contact area between the surface of the base member and the resin layer is increased, and the resin layer intrudes into the concave portions, so that a so-called anchor effect is exercised, whereby the adhesiveness between the base member and the resin layer can be enhanced.

Still furthermore, according to the present invention, in the above construction, a heating temperature when the heating is performed is set in the range from 160° C. to 240° C. For example, the silver particles which are adjusted to nano size are thermally fused with one another by heating the silver particles at 160° C. or more. On the other hand, when the silver particles are heated at 240° C. or more, the specific strength (strength per unit weight) of the base member formed of aluminum or aluminum alloy is lowered. Therefore, in this construction, the heating temperature is set in the range from 160° C. to 240° C., whereby the nano-size silver particles can be thermally fused with one another without reducing the specific strength of the base member.

Still furthermore, according to the present invention, in the above construction, any one of alcohol-based solvent, aqueous solvent and ketone-based solvent is used as the polar solvent. Furthermore, according to the present invention, in the above construction, the coating is performed by a screen print method. According to this construction, the suspended solution having the silver particles dispersed therein can be simply coated on the surface of the base member. Furthermore, according to the present invention, in the above construction, the sliding member is a piston.

Furthermore, according to the present invention, a sliding member having a sliding face that slides in a slid member is characterized in that a silver coating layer constituting the sliding face is provided on the surface of a base member formed of aluminum or aluminum alloy, and the silver coating layer is formed by coating suspended solution having silver particles dispersed in polar solvent on the surface of the base member, and heating the coated suspended solution and the base member to remove the solvent in the suspended solution and fuse the silver particles with one another.

According to this construction, the silver coating can be formed by fusing the silver particles coated on the surface of the base member. Since the silver coating and the base member are joined to each other by intermolecular force, so that the adhesiveness between the silver coating and the base member can be enhanced, and the sliding member coated with the silver coating having excellent mechanical strength can be simply formed. Furthermore, by making the solvent have polarity, the affinity between solvent and water is enhanced. Therefore, the affinity of the solvent to water molecules adsorbed on the surface of the base member is high when the suspended solvent using this solvent is coated on the surface of the base member, so that uniform coating can be formed particularly under even a humidity-uncontrollable working environment.

Furthermore, according to the present invention, a sliding member having a sliding face that slides in a slid member, is characterized by comprises: a resin layer having silver particles on the surface of a base member formed of aluminum or aluminum alloy; and a silver coating layer constituting the sliding face on the resin layer, wherein the silver coating layer and the silver particles in the resin layer are fused with each other.

According to this construction, the silver coating and the base member are joined to each other through the resin layer, and the silver particles in the resin layer is fused with the silver coating, whereby the adhesion stress between the base member and the silver coating can be enhanced, and the sliding member to which the silver coating having excellent mechanical strength is applied can be simply formed.

Furthermore, according to the present invention, in the above construction, the thickness of the silver coating film is set in the range from 1 µm to 20 µm. In this construction, the thickness of the silver coating layer is set in the range from 1 µm to 20 µm, and thus the sliding member having the sliding face which is reduced in friction due to the silver coating layer can be formed with an inexpensive construction.

Furthermore, according to the present invention, in this construction, uneven portions are formed on the surface of the base member, and the silver coating layer is formed on the uneven portions. According to this construction, the surface area of the base member can be increased by forming the uneven portions, and the adhesiveness between the base member and the silver coating layer can be further enhanced.

Still furthermore, according to the present invention, in the above construction, uneven portions are formed on the surface of the base member, and the resin layer and the silver coating layer are formed on the uneven portions. According to this construction, by forming the uneven portions, the contact area between the surface of the base member and the resin layer is increased, and the resin layer intrudes into the concave portions, so that a so-called anchor effect is exercised. Therefore, the adhesiveness between the base member and the resin layer can be enhanced. Furthermore, according to the present invention, in the above construction, the resin layer is formed of any one of imide-based resin, epoxy-based resin and nylon-based resin.

Effect of the Invention

According to the present invention, the silver coating can be formed by fusing the silver particles coated on the surface of the base member, and the silver coating and the base member can be joined to each other by intermolecular force. Therefore, the adhesiveness between the silver coating and the base member can be enhanced, and the sliding member to which the silver coating having excellent mechanical strength is applied can be simply formed.

Furthermore, according to the present invention, the silver coating formed by fusing the silver particles and the base member are joined to each other through the resin layer. Therefore, the adhesion stress between the base member and the silver coating can be enhanced, and the sliding member to which the silver coating having excellent mechanical strength is applied can be simply formed. Furthermore, the silver particles in the suspended solution are fused with the silver particles in the resin layer, so that the joint force between the silver coating and the resin layer can be enhanced.

Still furthermore, according to the present invention, in the sliding member having the sliding face which slides in the slid member, the silver coating layer constituting the sliding face is provided on the surface of the base member formed of aluminum or aluminum alloy, and the silver coating layer is formed by coating the suspended solution having the silver particles dispersed in the polar solvent on the surface of the base member and heating the coated suspended solution and the base member to remove the solvent in the suspended solution and fuse the silver particles. Therefore, the silver coating layer and the base member are joined to each other by intermolecular force, whereby the sliding member in which the adhesiveness between the silver coating layer and the base member is enhanced can be simply formed.

Still furthermore, according to the present invention, in the sliding member having the sliding face which slides in the slid member, the resin layer having the silver particles is provided on the surface of the base member formed of aluminum or aluminum alloy, the silver coating layer constituting the sliding face is formed on the resin layer, and the silver coating layer and the silver particles in the resin layer are fused with each other. Therefore, the silver coating and the base member are joined to each other through the resin layer, and the silver particles in the resin layer are fused with the silver coating, whereby the adhesion stress between the base member and the silver coating can be enhanced, and the sliding member to which the silver coating having excellent mechanical strength is applied can be simply formed.

BEST MODES FOR CARRYING OUT THE INVENTION

Embodiments according to the present invention will be described hereunder with reference to the drawings.

First Embodiment

Figure 1:
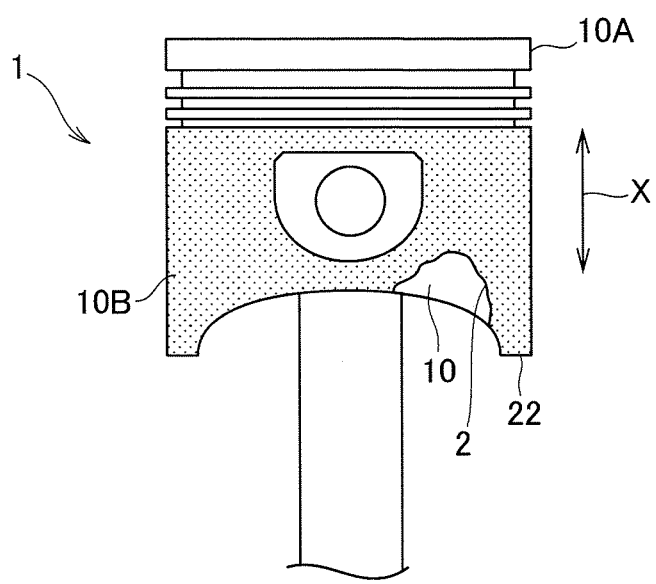
FIG. 1 is a side view showing a piston according to a first embodiment of the present invention.
Figure 2:
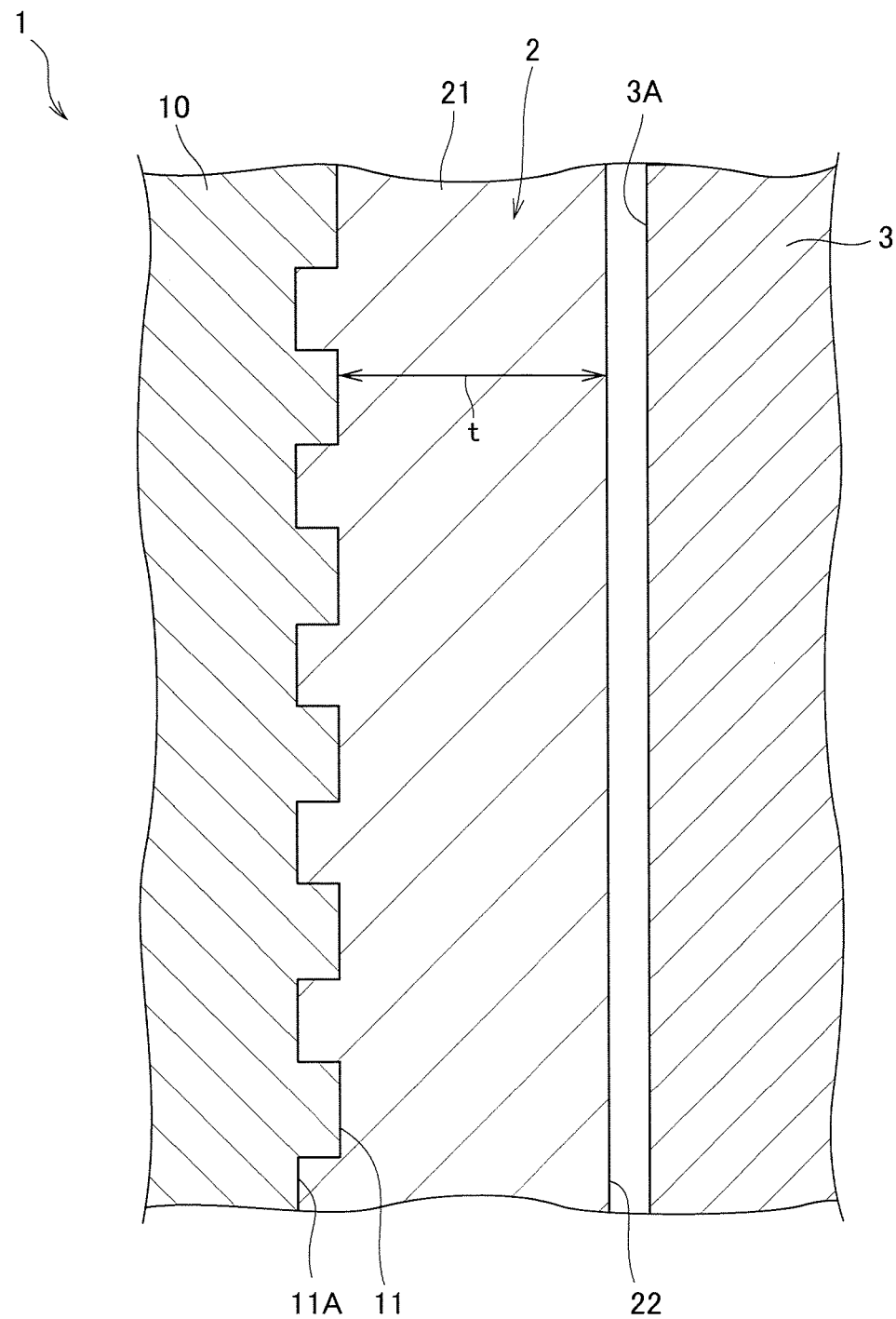
FIG. 2 is a side cross-sectional view showing a coating layer of the piston.

FIG. 1 is a side view showing a piston 1 as a sliding member according to the present invention. FIG. 1 shows the piston 1 while a part of a coating layer 2 is ruptured. FIG. 2 is a side cross-sectional view showing the coating layer 2 of the piston 1. FIG. 2 shows the coating layer 2 in combination with a part of a cylinder bore 3 in which the piston 1 reciprocates.

As shown in FIG. 1, the piston (sliding member) 1 has a main body (base member) 10 formed of aluminum alloy. The main body 10 is formed in a substantially cylindrical shape so as to have a land portion 10A and a skirt portion 10B, and a coating layer 2 is formed on the outer peripheral surface (surface) 11 of the main body 10 in the skirt portion 10B. As shown in FIG. 2, the coating layer 2 has a silver coating layer 21 which is firmly attached to the outer peripheral surface 11 of the main body 10.

The silver coating layer 21 forms a sliding face 22 to the inner wall 3A of the cast-iron cylinder bore 3 as a slid member, and the sliding face 22 comes into slip contact with (slides on) the inner wall 3A of the cylinder bore 3 through lubricant oil (not shown) when the piston 1 (skirt portion 10B) moves in the direction of an arrow X.

Silver is metal which is generally soft in hardness and excellent in thermal conductivity. Therefore, by forming the silver coating layer 21 as the sliding face 22 of the piston 1, the silver coating layer 21 is easily attrited (initially attrited) and deformed when the silver coating layer 21 comes into slip contact with the inner wall 3A of the cylinder bore 3 under the initial motion, thereby easily obtaining the sliding face 22 which has reduced friction to the inner wall 3A and has excellent sliding characteristic. Furthermore, heat transmitted to the silver coating layer 21 can be discharged to the outside through the lubricant at an early stage, so that the cooling efficiency of the main body 10 can be increased. Since FIG. 2 schematically shows the coating layer 2, FIG. 2 does not show the relative relationship of the thickness of the silver coating layer 21 and the size (depth) of concave portions 11A.

Fine concave portions 11A are formed on the outer peripheral surface 11 of the main body 10 (skirt portion 10B). Specifically, the concave portions 11A are formed by a shot blast method in which shot materials having a particle diameter adjusted to a predetermined particle diameter (for example, 10 μm) are shot to the outer peripheral surface 11 with compressed air or the like. The concave portions 11A increase the surface area of the outer peripheral surface 11 of the main body 10, and thus increases the contact area between the main body 10 and the silver coating layer 21, so that the adhesiveness between the main body 10 and the silver coating layer 21 can be further enhanced.

The main body 10 is subjected to ultrasonic cleaning for a predetermined time (for 10 minutes) while infiltrated in acetone solution, thereby removing oil and fat components adhering to the outer peripheral surface 11. In this case, it is desired to remove oxide film (aluminum oxide ($Al_2O_3$)) generated on the outer peripheral surface 11 of the main body by infiltrating the main body 10 in alkaline or acidic solution after the main body 10 is infiltrated in acetone solution. This is because the adhesiveness between the main body 10 and the silver coating layer 21 can be enhanced by removing the oxide film (or reducing the film thickness).

Subsequently, the silver coating layer 21 is formed on the outer peripheral surface 11 of the main body 10. The silver coating layer 21 is formed as follows. Silver particles which are adjusted to have a predetermined nano-size average particle diameter (from 1 nm to 80 nm) are coated on the outer peripheral surface 11 of the main body 10 and then heated to join these silver particles to the main body 10, and the silver particles are fused with one another. Specifically, the silver particles having the above average particle diameter are dispersed in terpineol as polar solvent to generate slurry (suspended solution) which is adjusted to have a predetermined viscosity (for example, 10 cp), and this slurry is coated (coated) on the outer peripheral surface 11 of the main body 10. In this embodiment, the slurry is coated on the outer peripheral surface 11 of the main body 10 by a screen print method using a screen of 400 mesh (not shown).

Figure 3:
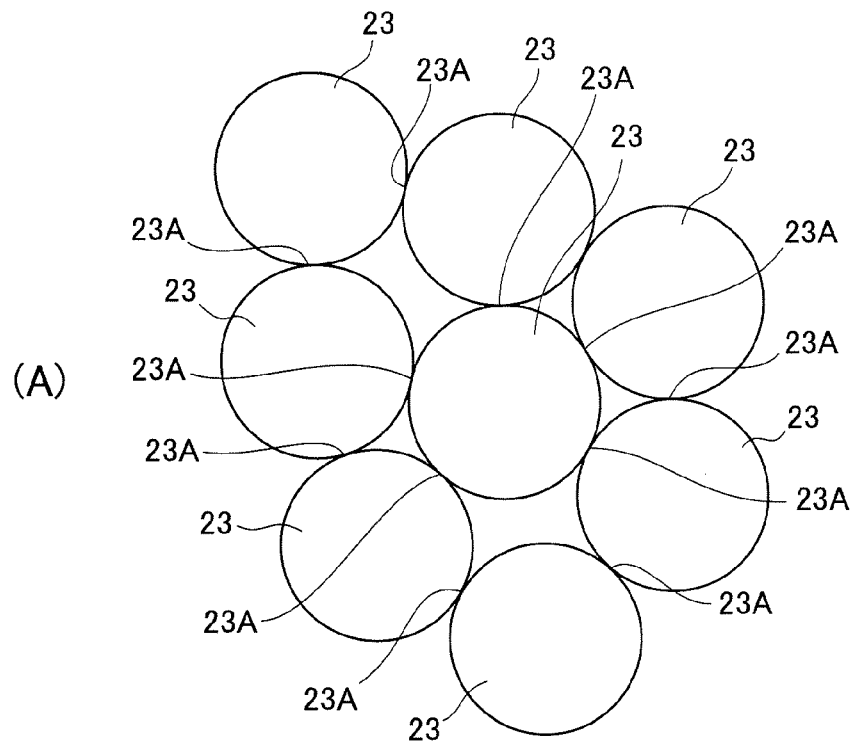
FIG. 3A is a schematic diagram showing silver particles dispersed in slurry.
FIG. 3B is a schematic diagram showing a silver coating layer formed by fusion of silver particles.
Figure 3:
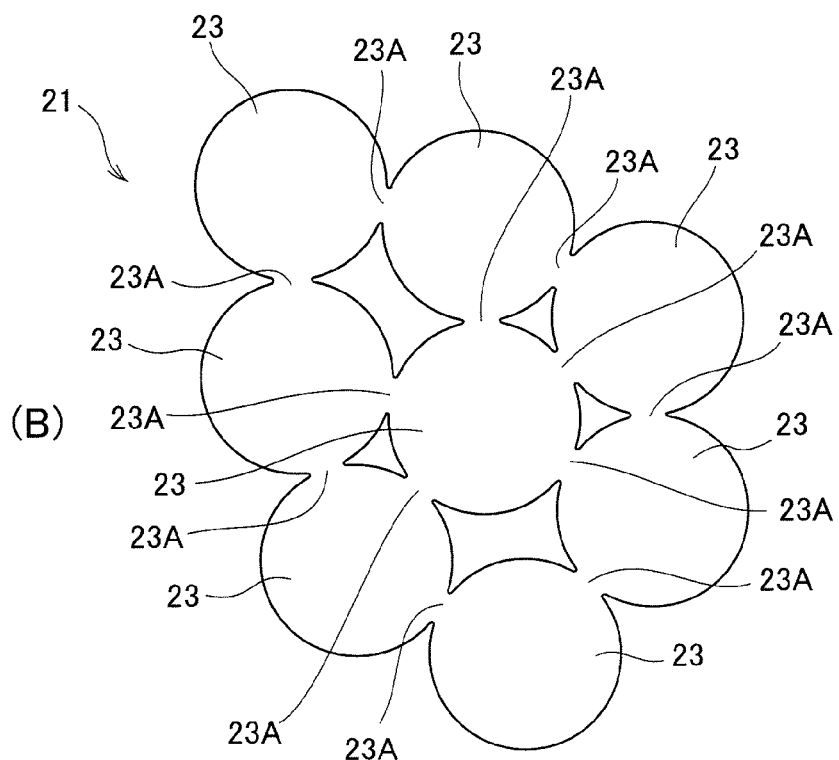

Under the state that the slurry is coated, the slurry concerned and the main body 10 are heated to vaporize terpineol in the slurry and fuse the silver particles in the slurry concerned. Specifically, as shown in FIG. 3A, a silver particle 23 in the slurry exists while coming into contact with other silver particles 23 at contact points 23A. When this slurry is heated, the silver particles 23 are fused and integrated with one another at the contact points 23A, thereby forming the silver coating layer 21 as shown in FIG. 3B.

Next, a heating temperature condition to form the silver coating layer 21 will be described.

Figure 4:
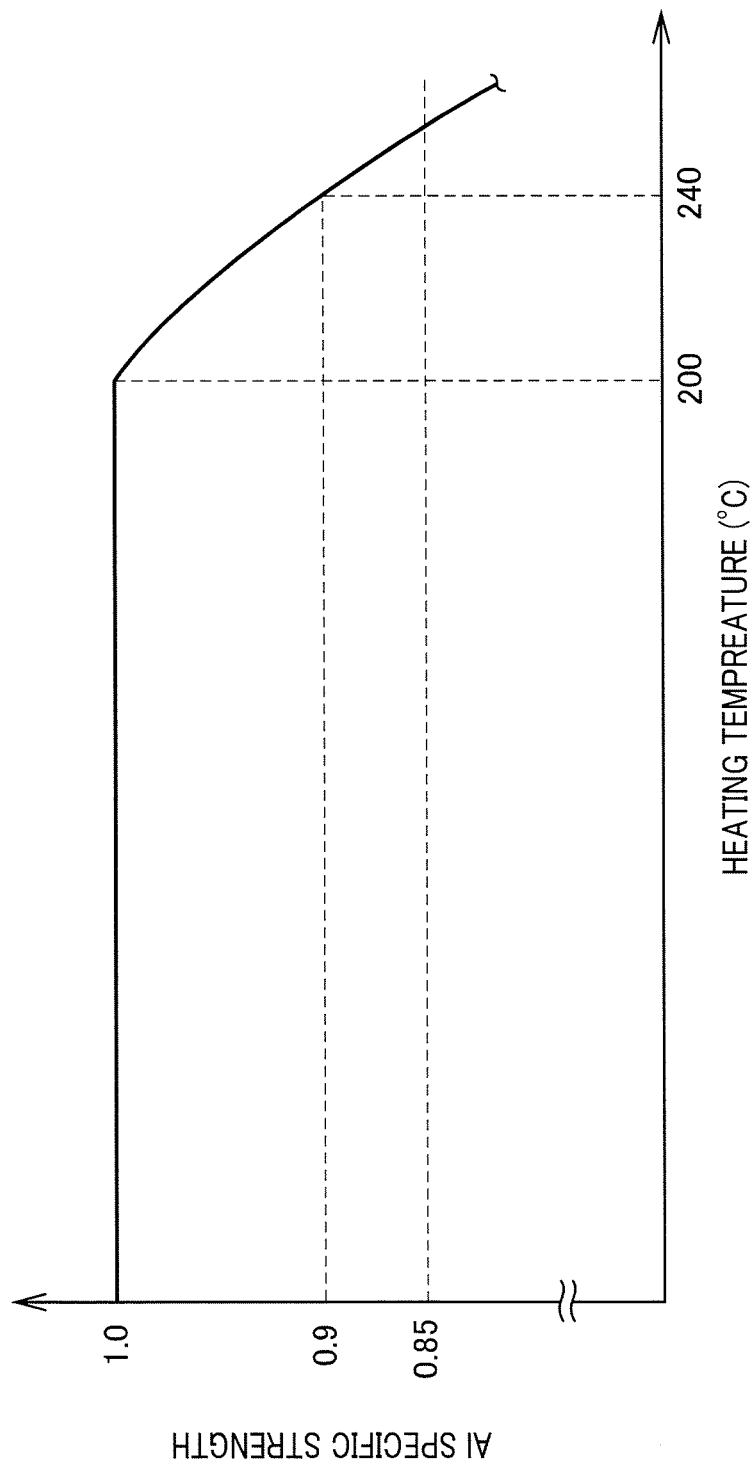
FIG. 4 is a graph showing the relationship between the specific strength of aluminum alloy and heating temperature.

FIG. 4 is a graph showing the relationship between the specific strength of the aluminum alloy and the heating temperature. In FIG. 4, the specific strength (the strength per unit weight) of the aluminum alloy from 0 to 200° C. is set to 1.0 and variation in a temperature range which is equal to and higher than 200° C. is shown. The strength of the aluminum alloy is calculated from a Rockwell hardness test.

With respect to aluminum alloy to form the main body 10, it has been found that the specific strength of the aluminum alloy trends to decrease as the temperature increases. Specifically, there is a tendency that the specific strength shifts with keeping 1.0 in the range from 0 to 200° C. without decrease, but gradually decreases at 200° C. or more as shown in FIG. 4. In general, the minimum limit strength is required to aluminum alloy as a base member under a harsh environment like piston of an internal combustion engine or the like. Therefore, when aluminum alloy uses for a piston or the like, the applicant sets the lower limit value of the specific strength of the aluminum alloy concerned according to a company's standard. This lower limit value is set to 0.85 with respect to the specific strength of 1.0 at 0 to 200° C. Accordingly, according to this embodiment, the heating temperature of aluminum alloy is set to not more than 240° C. which corresponds to the specific strength of 0.9 larger than the lower limit value of the specific strength of 0.85.

Figure 5:
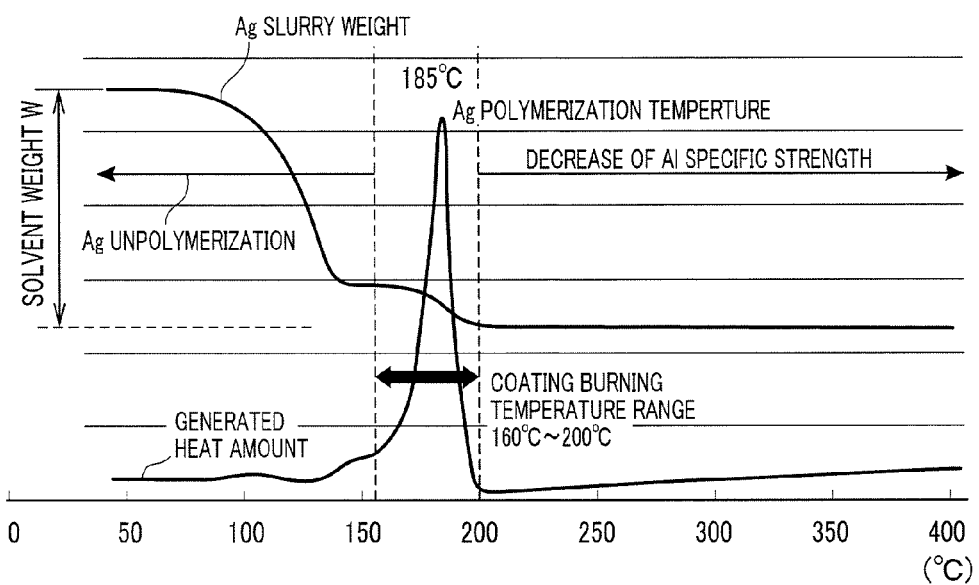
FIG. 5 is a graph showing variation of the slurry weight and generated heat quantity with respect to variation of the heating temperature of slurry containing silver particles.

FIG. 5 is a graph showing the variation of the slurry weight and the generated amount of heat with respect to the variation of the heating temperature of slurry containing silver particles.

As shown in FIG. 5, the generated heat amount of the slurry is large between 160° C. and 200° C. in heating temperature while having a peak at the heating temperature of 185° C. This means that reaction heat when the silver particles in the slurry are fused (polymerized) occurs in this temperature zone. In other words, the silver particles in the slurry are fused with one another by heating the silver particles at the temperature of 160° C. to 200° C., whereby the silver coating layer 21 can be formed.

Therefore, in this construction, the heating temperature is set in the range from 160° C. to 240° C., more preferably in the range from 160° C. to 200° C., whereby the silver particles adjusted to the nano-size can be thermally fused with one another without reducing the specific strength of the main body 10 (base member).

Furthermore, the weight of the slurry decreases from the heating temperature of about 80° C. Although the decrease degree of the slurry weight is small in the neighborhood of 140° C., the slurry weight decreases again in the neighborhood of 180° C. and remains substantially on the same level in the neighborhood of 200° C. This decrease amount is the solvent weight W of terpineol as polar solvent, and it is desirable that almost all solvent is vaporized when the heating temperature reaches 200° C. Furthermore, in this construction, the slurry is coated on the outer peripheral surface 11 of the main body 10 at normal temperature, and thus it is desirable that the solvent is hardly vaporized at normal temperature. In this embodiment, terpineol is used as the polar solvent, and the weight variation is little in the case of terpineol under the normal temperature atmosphere as shown in FIG. 5. Therefore, it is rare that the solvent in the slurry is vaporized during a coating process and thus the viscosity or concentration of the slurry varies. Accordingly, unevenness in the coating process is little, and the coating process can be performed with stable quality. Furthermore, almost all terpineol is vaporized under the state that it is heated to 200° C., and thus the rate of silver in the solver coating layer 21 can be increased. Still furthermore, according to this construction, the slurry of the silver particles is formed by using terpineol as polar solvent. Terpineol has polarity, and thus it has enhanced affinity to water. Accordingly, when the slurry using terpineol is coated on the outer peripheral surface 11 of the main body 10, it has high affinity to water molecules adsorbed on the outer peripheral surface 11, so that uniform silver coating layer 21 can be formed under even a working environment which is not controlled in humidity.

In this embodiment, terpineol as alcohol-based solvent is used as the polar solvent, however, the present invention is not limited to this style. Nonanol or ethyleneglycol as alcohol-based solvent, PGMEA (propyleneglycol monomethyl ether acetate) as aqueous solvent ormethyl ethyl ketone as ketone-based solvent may be used. In this case, even when any one of these materials is used, it has a characteristic that it is little vaporized at normal temperature and almost all of it is vaporized when it is heated to 160° C. to 240° C. which is the heating temperature to generate the silver coating layer 21.

Next, the particle diameter of the silver particles in the slurry will be described.

Figure 6:
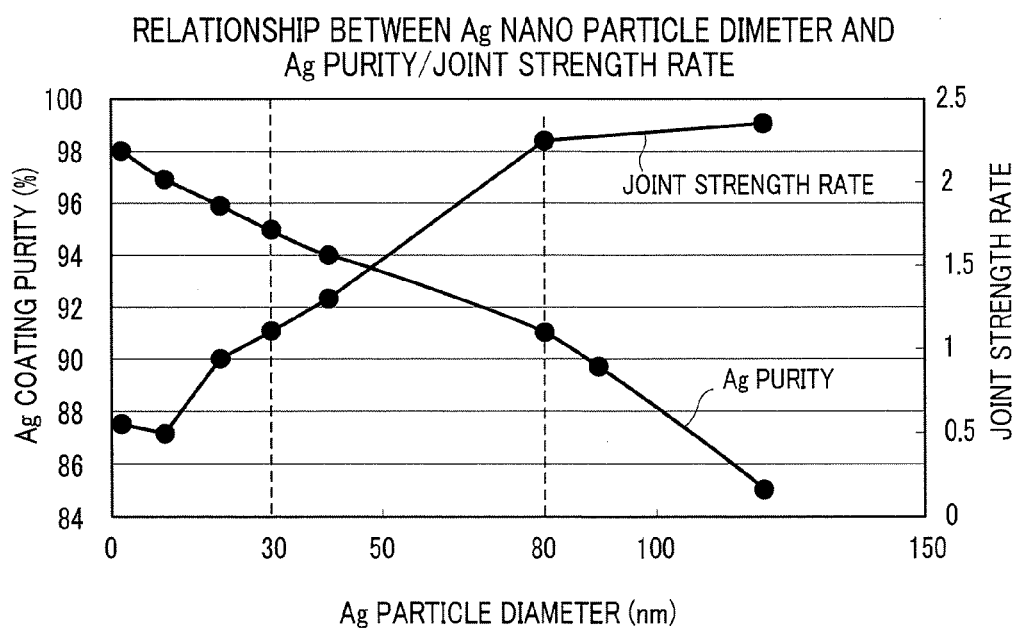
FIG. 6 is a graph showing the relationship between the silver particle diameter and the purity of silver, the adhesion strength rate.

FIG. 6 is a graph showing the relationship between the silver particle diameter and silver purity, the joint strength rate. Here, the silver purity is defined as the rate of the volume of silver metal existing in the silver coating layer 21 per unit volume. The joint strength rate represents the ratio of the joint force between a reference silver coating layer formed of silver particles having a predetermined average reference particle diameter (20 nm in this construction) and each of silver coating layers formed of silver particles which are different in average particle diameter. In this construction, the joint strength rate is determined by conducting a tape peel test after a tumbling test is conducted and comparing the area of silver coating which is peeled off from the main body and adheres to the adhesion face of the tape. When the area of the silver coating adhering to the tape is smaller than the area of the tape concerned, it means that the joint force (mechanical strength) is stronger to that extent. In general, with respect to a member used under a harsh environment like a piston or the like, the area ratio of the silver coating adhering to the tape is adjusted to be 10% or less. Furthermore, the tumbling test is a test in which steel balls of 2 to 5 mm in diameter and several kilograms in weight and a workpiece to be estimated (in this case, the main body 10 coated with the silver coating) are put in a cylindrical container, and then the cylindrical container is rotated at 50 to 100 rpm for 20 to 30 minutes to thump the steel balls to the surface of the workpiece, thereby intentionally damaging the silver coating.

Each of the silver purity and the joint strength rate is closely connected to the average particle diameter of the silver particles 23. The silver purity trends to decrease more greatly as the average particle diameter of the silver particles 23 increases. When the average particle diameter of the silver particles 23 increases, the interval between the silver particles increases, and voids existing in the silver coating layers 21 when the silver particles are thermally fused with one another become large. Therefore, the silver purity is reduced, and the thermal conductivity of the silver coating layer 21 decreases, so that the sliding performance is deteriorated.

Accordingly, in order to secure a predetermined thermal conductivity suitable for sliding, the silver purity is required to be set to a predetermined threshold value (silver purity of 90%) or more. Therefore, in this construction, the average particle diameter of the silver particles 23 is set in the range from 1 nm to 80 nm, whereby the silver coating layer 21 having a high thermal conductivity can be formed.

On the other hand, the joint strength rate trends to increase as the average particle diameter of the silver particles 23 increases, and the joint force to the main body 10 is reduced and thus exfoliation of the silver coating layer 21 is more liable to occur as the average particle diameter of the silver particles 23 decreases. The silver coating layer 21 which is formed on a part sliding under a harsh environment like the piston 1 reciprocating in the cylinder bore 3 is required to have excellent mechanical strength (joint strength). Accordingly, in this construction, the average particle diameter of the silver particles 23 are set in the range from 30 nm to 80 nm to achieve a silver coating layer 21 having a high joint strength rate. By using the silver particles 23 in this range, the joint strength between the main body 10 and the silver coating layer 21 can be enhanced, and the silver purity in the silver coating layer 21 can be kept to a predetermined reference value or more which is suitable for sliding, thereby forming the piston 1 which have both the adhesiveness and thermal conductivity of the silver coating layer 21.

Furthermore, in this embodiment, the silver coating layer 21 is formed by using the slurry mixed with silver particles having average particle diameters of 30 nm and 80 nm. According to this construction, the silver particles having the average particle diameter of 30 nm enhances the thermal conductivity, and the silver particles having the average particle diameter of 80 nm enhances the joint force, thereby forming the piston 1 having the silver coating layer 21 which is further enhanced in adhesiveness and thermal conductivity.

As shown in FIG. 2, the silver coating layer 21 is configured so that the thickness t thereof is set in the range from 1 μm to 20 μm. It is difficult for the screen print method to set the thickness of the silver coating layer 21 to be smaller than 1 μm, and when the thickness of the silver coating layer 21 is smaller than 1 μm, the main body 10 is exposed and thus the sliding face 22 cannot be smoothly formed. On the other hand, when the thickness t of the silver coating layer 21 is set to be larger than 20 μm, the construction cost merely increases, and the sliding characteristic is not so enhanced. Furthermore, it has been found that sufficiently small friction can be realized by setting the thickness t of the silver coating layer 21 in the above range. Accordingly, in this embodiment, the thickness t of the silver coating layer 21 is set in the range from 1 µm to 20 µm, whereby the piston 1 which has the sliding face 22 having small friction through the silver coating layer 21 can be formed with an inexpensive construction.

As described above, according to the first embodiment, a method of manufacturing the piston 1 by forming silver film on the outer peripheral surface 11 of the main body 10 formed of aluminum alloy to form the sliding face 22 comprises: coating slurry having silver particles 23 dispersed in terpineol on the outer peripheral surface 11 of the main body 10; and heating the coated slurry and the main body 10 to remove terpineol in the slurry and fuse the silver particles 23 with one another, thereby forming the sliding face 22. Therefore, the silver coating layer 21 can be simply formed. The silver coating layer 21 and the main body 10 can be firmly joined to each other by intermolecular force. Therefore, the adhesiveness between the silver coating layer 21 and the main body 10 can be enhanced without generating any harmful material in the manufacturing process as in the case of the conventional electroplating method, and the piston 1 coated with the silver coating layer 21 having excellent mechanical strength can be simply formed. Furthermore, the uniform silver coating layer 21 can be formed by dispersing the silver particles 23 in terpineol.

Furthermore, according to the first embodiment, the average particle diameter of the silver particles 23 is set in the range from 30 nm to 80 nm, whereby the joint force between the main body 10 and the silver coating layer 21 can be enhanced, the silver purity in the silver coating layer 21 can be kept to a predetermined reference value or more which is suitable for sliding, and the piston 1 having both the adhesiveness and thermal conductivity of the silver coating layer 21 can be formed.

Furthermore, according to the first embodiment, the heating temperature for heating is set in the range from 160° C. to 240° C., whereby the silver coating layer 21 can be formed by thermally fusing the silver particles 23 without reducing the specific strength of the main body 10.

Still furthermore, according to the first embodiment, at least a part of oxide film on the outer peripheral surface 11 of the main body 10 is removed before the coating is applied. Therefore, a neogenetic face of aluminum alloy is formed on the outer peripheral surface 11, so that the adhesiveness between the neogenetic face and the silver coating layer 21 is enhanced.

Still furthermore, according to the first embodiment, before the coating is applied, concave portions 11A are formed on at least a part of the outer peripheral surface 11. Therefore, the surface area of the main body 10 can be increased, and the adhesiveness between the main body 10 and the silver coating layer 21 can be further enhanced.

Still furthermore, according to the first embodiment, the coating is performed by the screen print method. Therefore, the slurry having the dispersed silver particles 23 can be simply coated on the outer peripheral surface 11 of the main body 10.

Still furthermore, according to the first embodiment, the piston 1 having the sliding face 22 which slides in the cylinder bore 3 is provided with the silver coating layer 21 constituting the sliding face 22 on the outer peripheral surface 11 of the main body 10 formed of aluminum alloy, and the silver coating layer 21 is formed by coating the slurry having the silver particles 23 dispersed in terpineol on the outer peripheral surface 11 of the main body 10 and heating the coated slurry and the main body 10 to remove terpineol in the slurry and fuse the silver particles 23 with one another. Therefore, the silver coating layer 21 can be simply formed, and the silver coating layer 21 and the main body 10 can be firmly joined to each other by intermolecular force. Therefore, the adhesiveness between the silver coating layer 21 and the main body 10 can be enhanced without using any harmful material in the manufacturing process, and the piston 1 coated with the silver coating layer 21 having excellent mechanical strength can be simply formed. Furthermore, the uniform silver coating layer 21 can be formed by dispersing the silver particles 23 in terpineol.

Still furthermore, according to the first embodiment, the thickness t of the silver coating layer 21 is set in the range from 1 µm to 20 µm. Therefore, the piston 1 having the sliding face 22 whose friction is small due to the silver coating layer 21 can be formed with an inexpensive construction.

Second Embodiment

Figure 7:
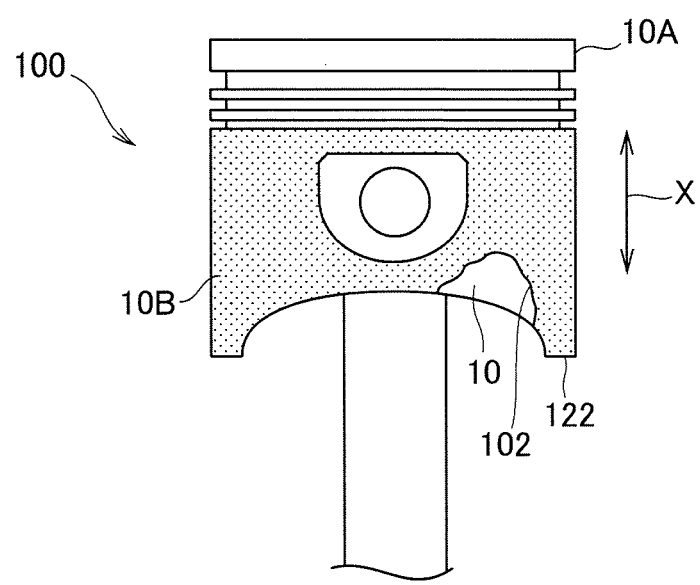
FIG. 7 is a side view showing a piston according to a second embodiment.
Figure 8:
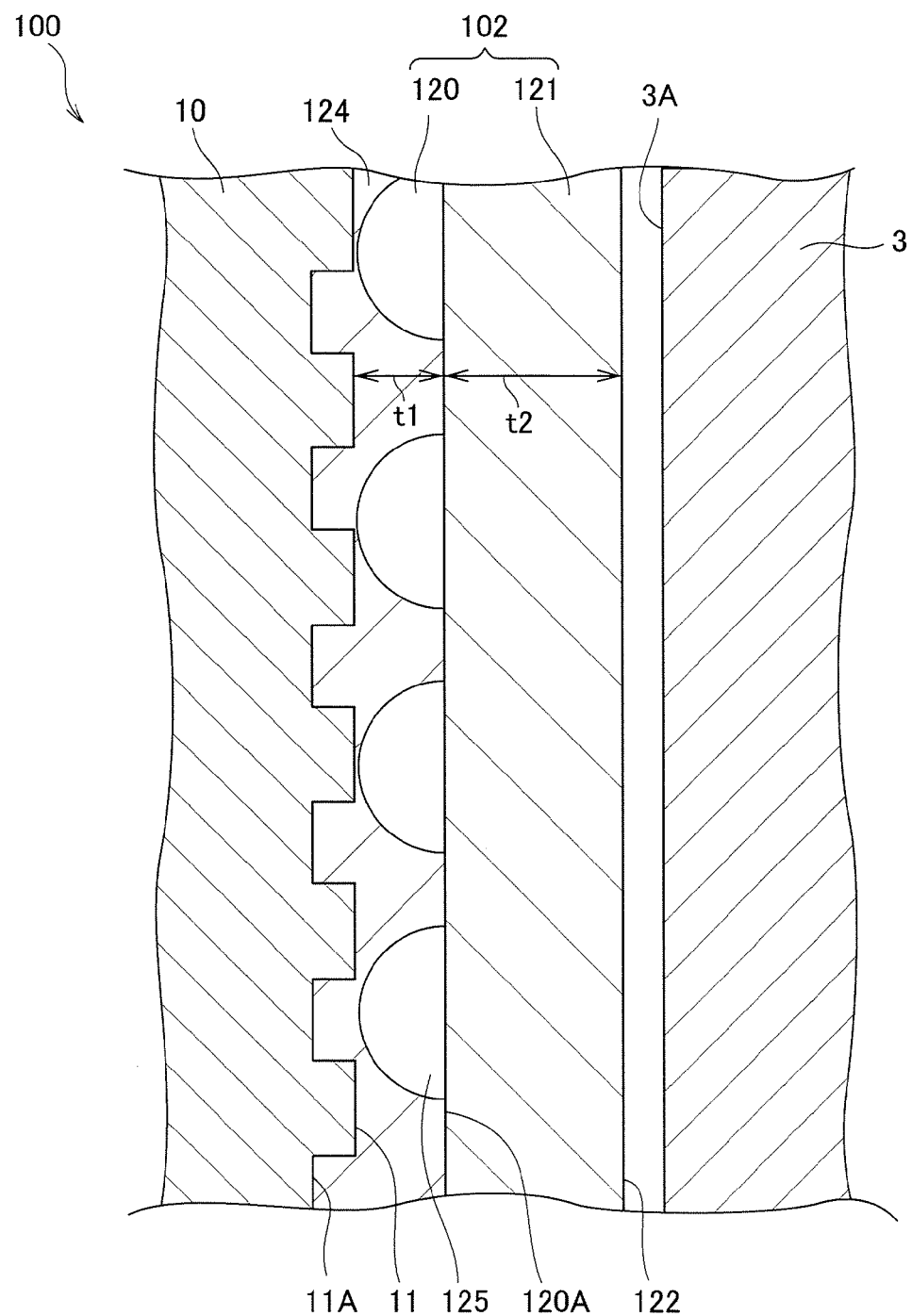
FIG. 8 is a side cross-sectional view showing a coating layer of the piston.

FIG. 7 is a side view showing a piston 100 as a sliding member according to a second embodiment. In FIG. 7, the piston 100 is illustrated while apart of a coating layer 102 is fractured. FIG. 8 is a side cross-sectional view showing the coating layer 102 of the piston 100. In FIG. 8, the coating layer 102 is illustrated in combination with a part of a cylinder bore 3 in which the piston 100 reciprocates.

As shown in FIG. 8, the piston (sliding member) 100 has a main body (base member) 10 formed of aluminum alloy. The main body 10 is formed in a substantially cylindrical shape so as to have a land portion 10A and a skirt portion 10B. The coating layer 102 is formed on the outer peripheral surface (surface) 11 of the main body 10 in the skirt portion 10B. The coating layer 102 has a resin layer 120 which adheres tightly to the surface of the main body 10, and a silver coating layer 121 which adheres tightly to the outer peripheral surface (surface) 120A of the resin layer 120, and the silver coating layer 121 forms a sliding face 122 to the inner wall 3A of the cylinder bore 3 formed of cast iron as a slid member. The sliding face 122 comes into slip contact with (slides along) the inner wall 3A of the cylinder bore 3 through lubricant (not shown) when the piston 100 (the skirt portion 10B) moves in the direction of an arrow X. FIG. 8 schematically shows the coating layer 102, and thus the thicknesses of the resin layer 120 and the silver coating layer 121, the size (depth) of concave portions 11A and the particle diameter of silver particles 125 (described later) in the resin layer 120 do not represent the relative relationship.

Fine concave portions 11A are formed on the outer peripheral surface 11 of the main body 10 (the skirt portion 10B). Specifically, the concave portions 11A are formed by the shot blast method in which shot materials having a particle diameter adjusted to a predetermined particle diameter (for example, 10 µm) are shot to the outer peripheral surface 11 with compressed air or the like. The concave portions 11A increase the contact area between the outer peripheral surface 11 of the main body 10 and the resin layer 120. Therefore, when the resin layer 120 is formed on the outer peripheral surface 11 of the main body 10, the resin layer 120 intrudes into the concave portions 11A, and thus a so-called anchor effect is exercised, so that the adhesiveness between the main body 10 and the resin layer 120 can be enhanced.

The main body 10 is subjected to ultrasonic cleaning for a predetermined time (for 10 minutes) while infiltrated in acetone solution, thereby removing oil and fat components adhering to the outer peripheral surface 11, and then the resin layer 120 is formed on the outer peripheral surface 11. In this case, it is desired to remove at least a part of oxide film formed on the outer peripheral surface 11 before the resin layer 120 is formed. According to this method, a neogenetic face of aluminum alloy is formed on the outer peripheral surface 11 of the main body 10, so that the adhesiveness between the neogenetic face and the resin layer 120 is enhanced.

The resin layer 120 is formed by mixing silver particles 125 having an average particle size adjusted to a predetermined average particle diameter (1 μm to 34 μm) in polyamide-imide resin 124 as a thermosetting resin material having an excellent heat resistance property. The polyaimide-imide resin 124 containing the silver particles 125 is coated on the outer peripheral surface 11 of the main body 10, and then hardened to form the resin layer 120. The resin layer 120 functions as an intermediate joint layer for making the main body 10 of the piston 1 as the base member and the silver coating layer 121 serving as the sliding face 122 tightly adhere to each other, and the thickness t1 of the resin layer 120 is set in the range from 1 μm to 6 μm. The reason why this range is set resides in that crack or the like is liable to occur in the resin layer 120 due to contraction caused by temperature variation when the thickness t1 of the resin layer 120 is larger than 6 μm. In this construction, the maximum value of the average particle diameter of the silver particles 125 is set to be larger than the thickness t1 of the resin layer 120, and thus the silver particles 125 project from the outer peripheral surface 120A of the resin layer 120. Therefore, during the process of forming the silver coating layer 121 described later, the silver particles 125 are fused with the silver coating layer 121, and thus functions to enhance the adhesiveness between the silver coating layer 121 and the resin layer 120.

In the second embodiment, polyamide-imide resin is used as the resin material, however, the present invention is not limited to this material. Polyimide as imide-based resin, epoxy as epoxy-based resin, nylon 6, nylon 6,6 as nylon-based resin may be likewise used.

The silver coating layer 121 is formed by fusing the silver particles which are adjusted to have a predetermined average particle diameter (1 nm to 80 nm). Specifically, the silver particles having the above average particle diameter are dispersed in terpineol as polar solvent so that the viscosity thereof is adjusted to a predetermined viscosity (for example, 10 cp) to generate slurry (suspended solution), and the slurry is coated (coated) on the outer peripheral surface 120A of the resin layer 120 by the screen print method. In this embodiment, the slurry is coated on the outer peripheral surface 120A of the resin layer 120 through a screen of 400 mesh.

Under the state that the slurry is coated, the slurry, the resin layer 120 and the main body 10 are heated to vaporize terpineol in the slurry and fuse the silver particles in the slurry. This point is the same as FIGS. 3A and 3B of the first embodiment, and the description thereof is omitted.

The heating temperature condition and the polar solvent to be used when the silver coating layer 121 of the second embodiment is formed are the same as the first embodiment, and the description thereof is omitted.

Next, the particle diameter of the silver particles in the slurry will be described.

Figure 9:
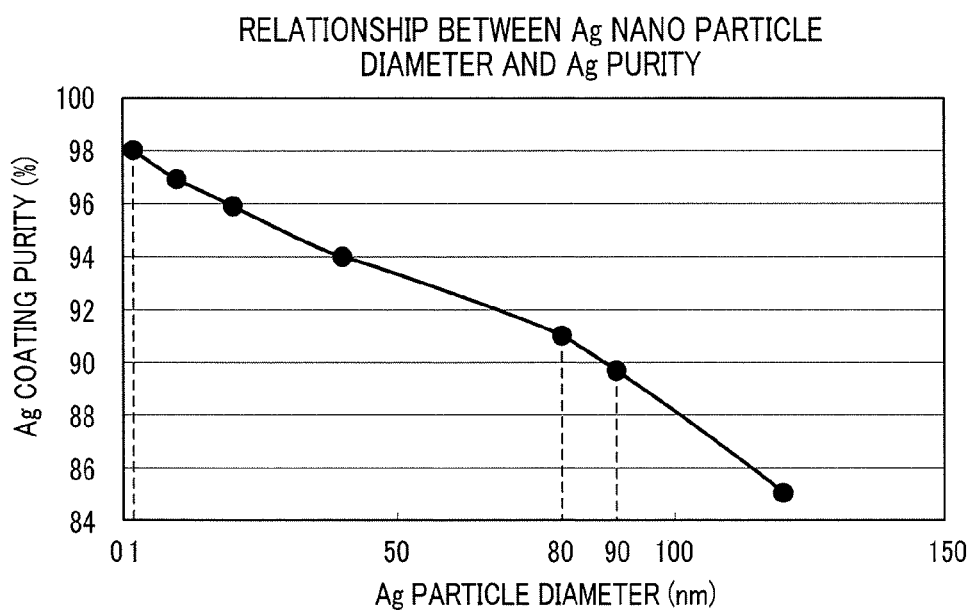
FIG. 9 is a graph showing the relationship between the silver particle diameter and the silver purity.

FIG. 9 is a graph showing the relationship between the silver particle diameter and the silver purity. As described with respect to the first embodiment, when the silver purity decreases, the thermal conductivity of the silver coating layer 121 decreases in connection with the decrease of the silver purity, and the sliding performance is deteriorated. In order to secure a desired thermal conductivity suitable for sliding, the silver purity is required to be equal to or larger than a predetermined threshold value (silver purity of 90%). Therefore, in the second embodiment, the average particle diameter of the silver particles 23 is set in the range from 1 nm to 80 nm.

Accordingly, even when the average particle diameter is set to the maximum average particle diameter of 80 nm, the silver purity in the silver coating layer 121 can be kept to a predetermined reference value or more which is suitable for sliding, and the piston 100 having high thermal conductivity can be formed.

Furthermore, in the first embodiment described above, when the average particle diameter is excessively small, the joint force to the main body 10 is lowered, and exfoliation of the silver coating layer 21 is liable to occur. Therefore, the average particle diameter is set in the range from 30 nm to 80 nm. However, in the second embodiment, since the resin layer 120 is interposed between the main body 10 and the silver coating layer 121, the main body 10 and the silver coating layer 121 can be firmly joined to each other by the resin layer 120 even when the silver particles 23 having a smaller average particle diameter (from 1 nm to 30 nm) are used.

Furthermore, the thickness t2 of the silver coating layer 121 is set in the range from 1 μm to 20 μm as in the thickness t1 of the silver coating layer 21 of the first embodiment.

Next, the joint structure between the silver coating layer 121 and the resin layer 120 will be described.

Figure 10:
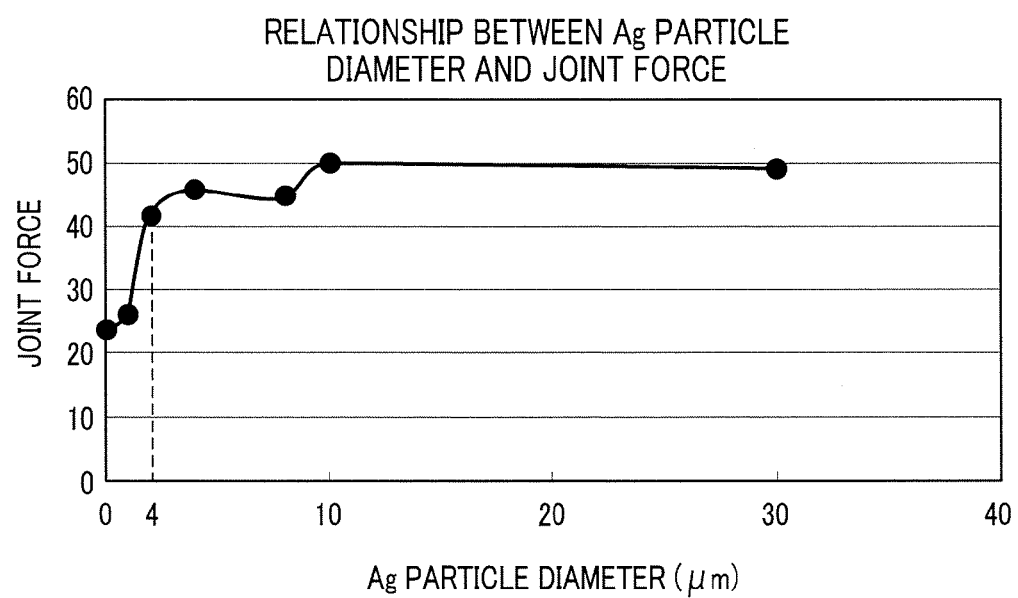
FIG. 10 is a graph showing the relationship of the particle diameter of the silver particles in a resin layer and the adhesion force between the silver coating layer and the resin layer.
Figure 11:
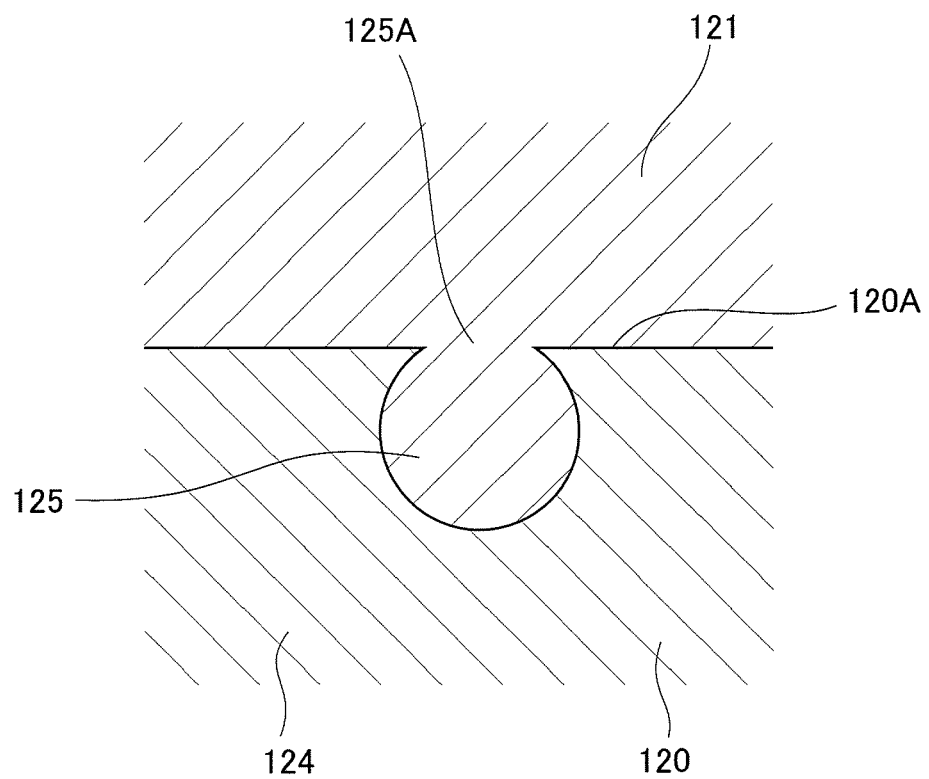
FIG. 11 is a cross-sectional view showing the state that the silver particles in the resin layer is fused with the silver coating layer.

FIG. 10 is a graph showing the relationship between the particle diameter of the silver particles 125 in the resin layer 120 and the joint force between the silver coating layer 121 and the resin layer 120. FIG. 11 is a cross-sectional view showing the state that the silver particles 125 in the resin layer 120 are fused with the silver coating layer 121.

The joint force between the silver coating layer 121 and the resin layer 120 is measured by using a scratch test method. The joint strength is measured by pressing a contact core against a coating film under a fixed load and measuring a force inducing exfoliation of the coating on the basis of a displacement amount of the contact core when the contact core is moved in a vertical direction from the tip of the contact core under the state that the contact core penetrates through the coating.

As described above, the silver coating layer 121 and the resin layer 120 tightly adhere to each other through the fusion of the silver particles 125 in the resin layer 120 with the silver particles 23 (FIG. 3) in the slurry when the silver coating layer 121 is formed. Specifically, as shown in FIG. 11, the silver particles 125 exposed to the outer peripheral surface 120A of the resin layer 120 are fused with the silver coating layer 121 (the silver particles 23 forming the silver coating layer 121) on the exposed face 125A, whereby the silver coating layer 121 and the resin layer 120 tightly adhere to each other. Here, in the second embodiment, the average particle diameter of the silver particles 125 contained in the resin layer 120 is set in the range from 4 μm to 30 μm. When the average particle diameter of the silver particles 125 in the resin layer 120 is smaller than 4 μm, the contact area between the silver particles 125 and the silver particles 23 forming the silver coating layer 121 is small, so that the joint force between the resin layer 120 and the silver coating layer 121 is lowered as shown in FIG. 10. On the other hand, when the average particle diameter of the silver particles 125 in the resin layer 120 is larger than 30 μm, the silver particles 125 are hardly dispersed in the resin layer 20. Therefore, in the second embodiment, the average particle diameter of the silver particles 125 in the resin layer 120 is set in the range from 4 μm to 30 μm, whereby the joint force between the silver particles 125 in the resin layer 120 and the silver coating layer 121 can be enhanced.

Here, when the average particle diameter of the silver particles 125 is set to 30 μm, the sliver particles 125 project from the sliding face 122 of the silver coating layer 121 formed on the outer peripheral surface 120A of the resin layer 120. In this case, this projecting portion comes into slip contact with the inner wall 3A of the cylinder bore 3 at the initial motion time, and attrited (initial attrition), and thus the sliding face 122 is formed as a surface which reduces the friction to the inner wall 3A.

As described above, according to the second embodiment, a method of manufacturing a piston 100 in which silver film is formed on the outer peripheral surface 11 of the main body 10 formed of aluminum alloy to form a sliding face 122 comprises: forming a resin layer 120 containing silver particles 125 is formed on the outer peripheral surface 11 of the main body 10, coating slurry having silver particles 23 (FIG. 3) dispersed in terpineol on a resin layer 120, heating the coated slurry, the resin layer 120 and the main body 10 in the range from 160° C. to 240° C. to fuse the silver particles 125 in the resin layer 120 and the silver particles 23 in the slurry and fuse the silver particles 23 in the slurry with one another, thereby forming the sliding face 122. Therefore, the silver coating layer 121 and the main body 10 are joined to each other through the resin layer 120. Therefore, the adhesion stress between the main body 10 and the silver coating layer 121 can be enhanced without using any harmful material in the manufacturing process as in the case of the conventional electroplating method, and the piston 100 coated with the silver coating layer 121 having the excellent mechanical strength can be simply formed. Furthermore, according to the second embodiment, the silver particles 23 of the slurry are fused with the silver particles 125 in the resin layer 120 to form the silver coating layer 121. Therefore, the joint force between the silver coating layer 121 and the resin layer 120 can be enhanced.

Furthermore, according to the second embodiment, the average particle diameter of the silver particles 23 dispersed in terpineol is set in the range from 1 nm to 80 nm. Therefore, even when the average particle diameter is set to the maximum value of 80 nm, the silver purity in the silver coating layer 121 can be kept to a predetermined reference value or more which is suitable for sliding, and the piston 100 having high thermal conductivity can be formed.

Still furthermore, according to the second embodiment, the average particle diameter of the silver particles 125 contained in the resin layer 120 is set in the range from 4 nm to 30 nm, so that the joint force between the silver particles 125 in the resin layer 120 and the silver coating layer 121 can be enhanced.

Still furthermore, according to the second embodiment, the heating temperature when heating is conducted is set in the range from 160° C. to 240° C. Therefore, the silver particles 23 can be thermally fused with one another to form the silver coating layer 121 without reducing the specific strength of the main body 10.

Still furthermore, according to the second embodiment, before the resin layer 120 is formed, uneven portions are formed on at least a part of the outer peripheral surface 11 of the main body 10. Therefore, the contact area between the outer peripheral surface 11 of the main body 10 and the resin layer 120 can be increased, and also the resin layer 120 intrudes into the concave portions 11A, whereby the so-called anchor effect is exercised. Accordingly, the adhesiveness between the main body 10 and the resin layer 120 can be enhanced.

Still furthermore, according to the second embodiment, since the coating is performed by the screen print method, the slurry having the silver particles 23 dispersed therein can be easily coated on the resin layer 120.

Still furthermore, according to the second embodiment, in the piston 1 having the sliding face 122 sliding in the cylinder bore 3, the resin layer 120 containing the silver particles 125 is provided on the outer peripheral surface 11 of the main body 10 formed of aluminum alloy, the silver coating layer 121 constituting the sliding face 122 is formed on the resin layer 120, and the silver coating layer 121 and the silver particles 125 in the resin layer 120 are fused with each other. Therefore, the silver coating layer 121 and the main body 10 are joined to each other through the resin layer 120, and the silver particles 125 in the resin layer 120 are fused with the silver coating layer 121, whereby the adhesion stress between the main body 10 and the silver coating layer 121 can be enhanced and the piston 100 coated with the silver coating layer 121 having excellent mechanical strength can be easily formed.

Still furthermore, according to the second embodiment, the thickness t2 of the silver coating layer 121 is set in the range from 1 μm to 20 μm, whereby the piston 100 having the sliding face 122 which is small in friction due to the silver coating layer 121 can be formed with an inexpensive construction.

The present invention is not limited to the first and second embodiments described above, and it is needless to say that various constructions may be adopted without departing from the subject matter of the present invention. For example, in the first and second embodiments described above, the main body 10 of the piston 1, 100 is formed of aluminum alloy. However, it is needless to say that the main body 10 is formed of aluminum metal.

Furthermore, in the first and second embodiments, the silver film layer 21, 121 is formed on the skirt portion 10B of the piston 1, 100 as the sliding member. However, the present invention is not limited to this construction. The silver coating layer 21, 121 may be formed on the sliding face of a crankshaft, a bearing metal, a cam shaft or the like.

DESCRIPTION OF REFERENCE NUMERALS 1, 100 piston (sliding member)
2, 102 coating layer
3 cylinder bore (slid member)
3A inner wall
10 main body (base member)
10A land portion
10B skirt portion
11 outer peripheral surface (surface)
11A concave portion
21, 121 silver coating layer
22, 122 sliding face
23 silver particle
120 resin layer
120A outer peripheral surface
124 polyamide-imide resin
125 silver particle
125A exposed face

The invention claimed is:

1. A sliding member having a sliding face that slides in a slid member, comprising:
   a resin layer containing silver particles having an average particle diameter ranging from 4 μm to 30 μm on the surface of a piston skirt formed of aluminum or aluminum alloy; and
   a silver coating layer containing silver particles and constituting the sliding face on the resin layer, wherein the silver particles of the silver coating layer and the silver particles in the resin layer are fused with each other.

2. The sliding member according to claim 1, wherein the thickness of the silver coating layer is set in the range from 1 μm to 20 μm.

3. The sliding member according to claim 1, wherein uneven portions are formed on the surface of the piston skirt, and the resin layer is formed on the uneven portions.

4. The sliding member according to claim 1, wherein the resin layer is formed of any one of imide-based resin, epoxy-based resin and nylon-based resin.

5. A sliding member manufacturing method of forming silver film on the surface of a base member formed of aluminum or aluminum alloy to form a sliding face, wherein the base member is a piston skirt, and the method comprises:

coating suspended solution containing silver particles having an average particle diameter ranging from 30 nm to 80 nm dispersed in polar solvent on the surface of the piston skirt; and heating the coated suspended solution and the piston skirt to remove the solvent in the suspended solution and fuse the silver particles with one another to form the sliding face.

6. The sliding member manufacturing method according to claim 5, wherein at least a part of oxide film on the surface is removed before the coating is performed.

7. The sliding member manufacturing method according to claim 5, wherein uneven portions are formed on at least a part of the surface before the coating is performed.

8. The sliding member manufacturing method according to claim 5, wherein any one of alcohol-based solvent, aqueous solvent and ketone-based solvent is used as the polar solvent.

9. The sliding member manufacturing method according to claim 5, wherein the coating is performed by a screen print method.

10. A sliding member manufacturing method of forming silver film on the surface of a base member formed of aluminum or aluminum alloy to form a sliding face, wherein the base member is a piston skirt, and the method comprises:

forming a resin layer containing silver particles having an average particle diameter ranging from 4 μm to 30 μm on the surface of the base member;

coating suspended solution containing silver particles having an average particle diameter ranging from 1 nm to 80 nm dispersed in polar solvent on the resin layer; and heating the coated suspended solution, the resin layer and the piston skirt to fuse the silver particles in the resin layer with the silver particles in the suspended solution and fuse the silver particles in the suspended solution with one another to form the sliding face.

11. The sliding member manufacturing method according to claim 10, wherein the resin layer is formed by using any one of imide-based resin, epoxy-based resin and nylon-based resin.

12. The sliding member manufacturing method according to claim 10, wherein at least a part of oxide film on the surface is removed before the resin layer is formed.

13. The sliding member manufacturing method according to claim 10, wherein uneven portions are formed on at least a part of the surface before the resin layer is formed.

14. The sliding member manufacturing method according to claim 10, wherein a heating temperature when the heating is performed is set in the range from 160° C. to 240° C.

15. The sliding member manufacturing method according to claim 10, wherein any one of alcohol-based solvent, aqueous solvent and ketone-based solvent is used as the polar solvent.

16. The sliding member manufacturing method according to claim 10, wherein the coating is performed by a screen print method.

\* \* \* \* \*